United States Patent Office 3,299,080
Patented Jan. 17, 1967

3,299,080
PROCESSES AND INTERMEDIATES FOR PREPARING CERTAIN 2-THIAZOLYLBENZIMIDAZOLES
George Gal, Summit, and Meyer Sletzinger, North Plainfield, N.J., assignors to Merck & Co., Inc., Rahway, N.J., a corporation of New Jersey
No Drawing. Filed July 5, 1962, Ser. No. 207,779
20 Claims. (Cl. 260—302)

This invention relates to novel processes for preparing benzimidazole derivatives. More particularly it relates to a process for preparing benzimidazoles which are substituted in the 2-position with a mercapto substituted thiazolyl radical. It further relates to novel intermediates utilized in the process of producing said benzimidazoles.

It has recently been discovered that certain 2-substituted benzimidazoles have desirable anti-parasitic activity. Specific among these are benzimidazoles substituted in the 2-position with a thiazolyl radical. There have been increased efforts directed toward providing alternate means for preparing compounds of this series. It is an object of this invention to present such a process. It is a further object of this invention to produce novel compounds utilized in the preparation of the therapeutically active benzimidazole compounds.

The end compounds which the process of the present invention yields are benzimidazoles which are depicted structurally as

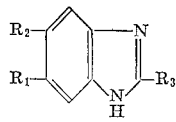

where $R_1$ and $R_2$ are selected from the group consisting of hydrogen, lower alkyl, lower alkoxy and trifluoromethyl groups, and $R_3$ is a 2-mercaptothiazolyl radical having the following structure:

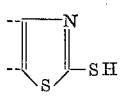

where the point of attachment between the thiazolyl radical and the 2-carbon of the benzimidazole nucleus is at either the 4-carbon atom or 5-carbon atom of the thiazolyl radical. The end compounds which may be produced include 2(2'-mercapto 4'-thiazolyl)benzimidazole, 2(2'-mercapto 5'-thiazolyl)benzimidazole, 2(2'-mercapto 4'-thiazolyl) 6-methyl benzimidazole, 2(2'-mercapto 4'-thiazolyl) 6-methoxy benzimidazole, 2(2'-mercapto 5'-thiazolyl)5,6-dimethyl benzimidazole, 2(2'-mercapto 5'-thiazolyl)6-trifluoromethyl benzimidazole, 2(2'-mercapto 5'-thiazolyl)5-ethyl benzimidazole and the like. The invention further encompasses the acid addition salts and alkali metal, alkaline earth metal and ammonium salts of these compounds. Illustrative of the acid addition salts are the hydrochloric, hydrobromic, hydroiodic, sulfuric, phosphoric acid salts as well as aliphatic acid salts such as obtained from acetic acid, propionic acid and the like. Typical of the alkali and alkaline earth metal type salts are those obtained by treatment with a base such as sodium, potassium, calcium, barium and ammonium hydroxides.

Also within the scope of the invention are novel compounds obtained as intermediates of the process of the invention, namely; 2-mercaptothiazole 4-carboxylic acid chloride, 2-mercaptothiazole 4-carboxylic acid bromide, 2-mercaptothiazole 5-carboxylic acid chloride and 2-mercaptothiazole 5-carboxylic acid bromide designated as compounds I in the flow diagram appearing hereinbelow; and novel mercaptothiazole nitroanilides exemplified by 2-mercaptothiazole 4-carboxy(2'-nitroanilide), 2-mercaptothiazole 5-carboxy(2'nitroanilide), 2-mercaptothiazole 4-carboxy(2'-nitro-4'-trifluoromethylanilide), 2-mercaptothiazole 5-carboxy(2'-nitro-4'-methylanilide), 2-mercaptothiazole 4 - carboxy(2'-nitro-4'-methoxy-5'-methylanilide), 2-mercaptothiazole 5-carboxy(2'-nitro-4'-ethoxyanilide), and the like designated as compounds II in the subsequently appearing flow diagram.

The process of the present invention stated broadly encompasses the halogenation of a mercapto substituted thiazole carboxylic acid to obtain novel acid halides, and the treatment of these halides with an orthonitroaniline to obtain novel condensation products of the general class of anilides. The anilide is then treated with a metal such as iron, zinc or tin in the presence of a strong acid to effect ring closure and thus produce novel 2-mercaptothiazolyl benzimidazoles. The process is illustrated structurally by the flow diagram appearing hereinbelow wherein the thiazole starting material is shown as 2-mercaptothiazole-4-carboxylic acid merely for purposes of clarity and not by way of limitation:

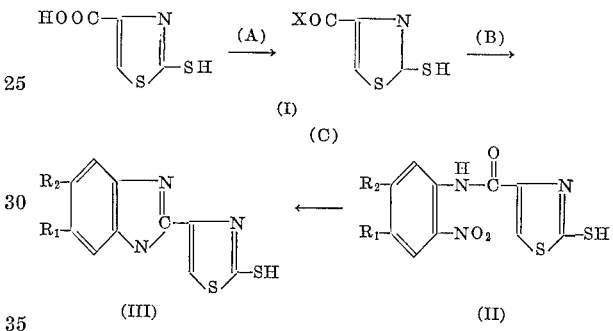

where X is a halogen and $R_1$ and $R_2$ are as previously assigned.

According to the first step of the process, Step A, the mercaptothiazole acids are halogenated to produce the acid halides. The thiazole acid starting materials have the following structural formula:

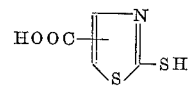

where the carboxylic acid group is substituted at either the 4 or 5 position of the thiazole ring. It has been discovered that halogenation at the carboxyl group will take place when thionyl halides such as thionyl chloride and thionyl bromide are employed as the halogenating agent. The temperature of the reaction is not critical. Suitable results are obtained, however, between temperatures of 50° C. and 150° C. and preferably between 70–120° C. The reaction is advantageously run in an inert solvent such as the aromatic solvents exemplified by benzene, xylene and toluene; and aliphatic hydrocarbons such as hexane, heptane and the like. At the conclusion of the reaction, the acid halide is obtained in solution and may be crystallized by cooling the reaction mass to room temperature or lower. It is preferred, when isolation is desired, to cool to temperatures of the order of 5° C. to −10° C. taking into consideration the freezing point of the system. In the preferred aspect of the invention, however, compounds I are not isolated, but rather are reacted immediately employing the process designated as Step B.

The formation of the anilide, Step B, contemplates reacting the formed acid halide (I) with an orthonitroaniline. The nitroaniline may be substituted in the positions meta and para to the amino group thereof by such substituents as lower alkyl, lower alkoxy and pseudo alkyl such as trifluoromethyl. In a preferred aspect, the nitroanilide is dissolved in an additional quantity of the same solvent used in Step A and the resulting solution then added to the reaction mixture obtained in that step. The temperature at which this phase of the process is carried out is normally between 60° C. and 150° C. although values outside this range may be employed. The novel, mercaptothiazole nitroanilides (II), are recovered from the reaction mass by cooling the reaction mixture to a temperature somewhat below room tempreature, such as between 10–20° C.

Step C of the process effects the ring closure of the anilide yielding the corresponding mercaptothiazolyl benzimidazole. The ring closure is effected by reacting the anilide (II) with iron, zinc or tin in the presence of a strong acid. Such acids as hydrochloric, hydrobromic, hydroiodic, sulfuric, phosphoric, and the like may be employed. The preferred acids are the hydrohalides with hydrochloric being most preferable. The relative amounts of metal and acid used in the reaction are interdependent and are critical. Specifically, the amounts used should be capable of supplying to the anilide greater than 3, but less than 13.5 moles of hydrogen per mole of anilide charged. Thus, the amounts will vary according to the number of equivalents the particular metal may provide and the monobasicity or polybasicity of the acid employed. The molar amounts of metal required when monobasic acids are used, have been found to be: for iron greater than 2 and less than 9; for zinc greater than 3 and less than 13.5; for tin greater than 1.5 and less than 6.5; all numbers as moles metal per mole of anilide charged. The corresponding amount of monobasic acid employed sufficient to supply an amount of hydrogen in the above indicated ranges may be calculated by one skilled in the art using conventional stoichiometric calculations. Upon such calculation the amounts of monobasic acid are greater than 3, 2 and 4 moles of acid per mole or iron, zinc and tin respectively. It will be appreciated that the upper limit on the acid is not critical when the amount of metal employed is within the ranges above indicated. However, it will be understood that the invention also encompasses those variations wherein the amount of metal employed is greater than values indicated but the amount of acid used is adjusted so that the quantity of hydrogen provided by the combination is still within the above designated range of 3 to 13.5 moles hydrogen per mole of anilide. The preferred operating ranges for the metals in moles metal per mole anilide charged are, 3–7 for iron, 4–11 for zinc and 2–6 for tin. The preferred amount of monobasic acid employed is between 5–10 moles of acid per mole of metal used so that an excess of acid is present after the reaction between the metal and acid. When polybasic acids or other metals are employed, calculations well known to those skilled in the art may be utilized for the purpose of determining relative amounts of each to be used such that the proper amount of hydrogen will be provided.

Step C of the process is run at elevated temperatures and preferably at the reflux temperature of the system. Such temperatures are exemplified by the range of 70° C. to 150° C. The particular solvents employed are not critical, but it is preferred for ease of operation and convenience to use a water-miscible solvent such as an aliphatic alcohol or ketone. In this regard, ethanol and methanol are preferred. Other inert solvents such as benzene and toluene may be employed with due consideration given to the mechanical difficulties involved in using a two phase system.

At the conclusion of Step C, the compounds III are obtained as the acid addition salts corresponding to the particular acid employed in the reaction when an excess of acid is employed. These salts are soluble in the reaction mass at the reaction temperature but may be precipitated by cooling the solution to temperatures below room temperature. Values of the order of 5° C. to 10° C. will normally be suitable. The free base may be obtained by neutralizing the acid salt with a base such as ammonium, alkali or alkaline earth metal hydroxides, carbonates and the like. Alternatively, the acid addition salts or the free bases may be converted to the water soluble salts by continuing the addition of the base to a pH in excess of 7. The compounds may be washed and dried according to techniques well known in the art.

When the combined amount of metal and acid used in Step C is sufficient to produce in excess of 13.5 moles of hydrogen per mole of anilide charged, compounds II are converted to the des-mercapto analog of compounds III, in amounts which increase with increasing amounts of hydrogen. The molar quantities of acid and metal used may be calculated similarly as the amounts were for Step C. The preferred operating range however is between 10–20 moles metal per mole of anilide charged taking into consideration the number of equivalents available from the metal and the acid. Thus, where a number in the preferred range is below that indicated in connection with the description of Step C, a higher number will be selected. Similarly, the amount of acid used should be sufficient to react all of the metal charged.

Preferably, the quantity of solvent employed in this alternative step is larger in amount than in Step C ranging from about 50 to 150 moles solvent per mole of anilide charged. The temperature at which the reaction takes place is not critical, but it is preferred to operate between the range of 75° C. to 150° C.

The compounds III and nontoxic acid addition salts thereof are useful in the treatment and prevention of helminth infections in domesticated animals such as sheep, cattle and swine. In treating infected animals, the compounds are mixed with an element of the animal's ration or with a nontoxic edible carrier to form a feed supplement which is then added to the animal's feed. They may also be administered in unit dosage forms such as boluses or liquid drenches. Water soluble salts of the compounds may be added to the animal's drinking water and used in that fashion.

The compound 2-mercaptothiazole-5-carboxylic acid may be prepared by condensing ammonium dithiocarbamate and ethylchloroformylacetate in aqueous alcohol using the procedure of J. J. D'Amico reported in Volume 25, Journal of Organic Chemistry 1960, page 1336.

The following examples are given for purposes of illustration and not by way of limitation.

EXAMPLE I

*2-mercaptothiazole-4-carboxylic acid bromide*

A solution of 16.1 g. of 2-mercaptothiazole-4-carboxylic acid (0.1 mole), 100 ml. xylene and 41.6 g. thionylbromide (0.2 mole) is heated to 130° C. and maintained at that temperature for 2 hours. At the end of this period about 25 ml. of xylene is distilled off at 130° C. and atmospheric pressure. The reaction mixture is cooled to 10° C. and the product, 2-mercaptothiazole-4-carboxylic acid bromide, crystallizes. The crystallized product is filtered and washed with petroleum ether and then dried in vacuo at 60° C.

EXAMPLE II

*2-mercaptothiazole-5-carboxy-(2'-nitro-4'5' dimethylanilide)*

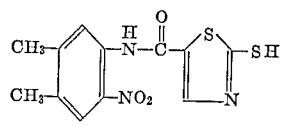

The procedure of Example I is followed utilizing equivalent amounts of 2-mercaptothiazole-5-carboxylic acid and thionyl chloride in place of the 2-mercaptothiazole-4-carboxylic acid and thionyl bromide to obtain 2-mercaptothiazole-5-carboxylic acid chloride. A solution of 13 g. of this product and 16.6 g. of 2-nitro-4,5-dimethylaniline (0.1 mole) in 150 ml. xylene is heated for 2 hours at 100° C. The reaction mixture is then cooled to 15° C. and the product 2-mercaptothiazole-5-carboxy-(2'-nitro-4',5'-dimethylanilide) crystallizes. The crystallized product is filtered, washed first with cold methanol, then with petroleum ether and dried under vacuum at 60° C.

When the above procedure is repeated using an equivalent amount of 2-nitro-4-trifluoromethylaniline or 2-nitro-4-methoxyaniline in place of 2-nitro-4,5-dimethylaniline, the corresponding anilide is obtained.

EXAMPLE III

*2-mercaptothiazole-4-carboxy-(2'-nitroanilide)*

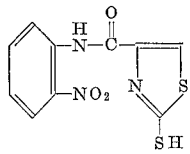

To a one liter, three necked flask, equipped with stirrer, condenser and thermometer, 64.5 g. 2-mercaptothiazole-4-carboxylic acid, 400 ml. xylene and 60 ml. of thionyl-chloride are charged. The reaction mixture is heated gradually over a period of one hour to 125° C. Hydrogen chloride and sulfur dioxide are observed to evolve at about 80° C. The reaction mixture is heated at 125° C. for 90 minutes. At the end of this period 100 ml. of xylene are distilled off at 125° C. The reaction mixture is then cooled to 30° C. and some of the intermediate mercaptothiazole acid chloride begins to crystallize. 55.2 g. of o-nitroaniline, dissolved in 200 ml. hot xylene is added slowly over a period of about 5 minutes to the cooled reaction mass and the entire mixture then heated to 100° C. and aged at this temperature for one hour with good stirring. After cooling to 20° C. the product, 2-mercaptothiazole-4-carboxy-(2'-nitroanilide) precipitates. It is filtered, washed first with 3 x 100 ml. cold methanol, then with petroleum ether and dried in vacuo at 55° C., M.P. 232–233° C.

EXAMPLE IV

*2-(2'-mercapto-4'-thiazolyl)-benzimidazole*

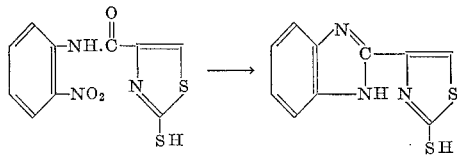

A slurry of 26.8 g. of iron in a solvent mixture of 250 ml. water and 15 ml. of ethanol, containing 0.5 g. ammonium chloride is heated to 80–90° C. for 10 minutes. Twenty-eight and two-tenths g. (28.2) of 2-mercapto-thiazole-4-carboxy(2'-nitroanilide) is added in one portion and the mixture heated for 5 hours at 95–97° C. with good stirring. Ninety ml. of concentrated hydrochloric acid is added over a period of 4 hours. After 3 hours aging period at 95° C., the reaction mixture is cooled to 20° C. and the hydrochloric acid salt of 2(2'-mercapto-4'-thiazolyl) benzimidazole precipitates. This precipitate is aged for an additional thirty minutes and then filtered. The filter cake is slurried in 150 ml. water containing 5 ml. concentrated hydrochloric acid at 60–70° C., and filtered. The filter cake is suspended in 200 ml. water and to this slurry 10 g. sodium hydroxide in 150 ml. of water, containing 1.0 g. of hydrogen sulfite is added thereby forming the soluble sodium salt of 2(2'-mercapto-4'-thiazolyl)benzimidazole. The basic solution is admixed with Supercel and then filtered through a Supercel pad. The basic filtrate is immediately acidified to pH 1 with concentrated hydrochloric acid and the yellow hydrochloric acid salt of the product precipitates. This is filtered, washed with cold water and vacuum dried at 60° C., M.P. 266–267° C.

The free compound is obtained from the acid salt after aging in the above procedure by suspending the filter cake in 200 ml. of water, heating to 50° C. and with constant agitation adjusting the pH of the suspension to 7 using sodium hydroxide solution. The resulting solution is then filtered while hot and the filtrate thus obtained cooled to 5° C. at which point the product crystallizes.

When the above procedure is repeated using equivalent amounts of hydrobromic, sulfuric or phosphoric acid in place of hydrochloric acid, the corresponding acid addition salt is obtained.

When the above procedure is repeated using ammonium, potassium or calcium hydroxide in place of the sodium hydroxide to obtain the soluble salts, the corresponding ammonium, potassium or calcium salt is obtained.

EXAMPLE V

*2(4'-thiazolyl) 6-methyl benzimidazole hydrosulfate*

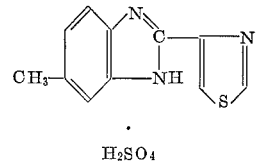

A slurry of 2.75 g. of 2-mercaptothiazole-4-carboxy-(2'-nitro-4'-methylanilide) and 1.9 g. of iron powder in 80 ml. of ethanol is refluxed at 78° C. Eight ml. of 10 N sulfuric acid is then added over 3 hours at reflux. Another 1.9 g. of iron is then added, followed by a 3 hour addition of 8 ml. of 10 N sulfuric acid at reflux. This is repeated twice with 1.9 g. iron and 8 ml. of 10 N sulfuric acid. After refluxing for an additional two hours the hot mixture is filtered and the filtrate concentrated to a volume of 25 ml. This is then dissolved in 50 ml. of 1 N sulfuric acid, and the solution cooled to 5° C. at which point the product crystallizes. The product is filtered, washed with 2 x 5 ml. ice cold water and dried in vacuo at 55° C.

All changes and modifications that come within the scope of the present invention are intended to be encompassed by the appended claims.

What is claimed is:

1. The process for the preparation of acid addition salts of a benzimidazole compound having the following formula

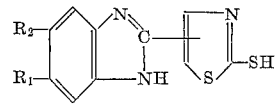

wherein $R_1$ and $R_2$ are selected from the group consisting of hydrogen lower alkyl, lower alkoxy and trifluoromethyl groups which comprises contacting an anilide of the formula

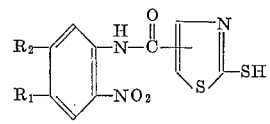

with hydrogen in the presence of a strong acid wherein the amount of hydrogen employed is greater than 3 and less than 13.5 moles per mole of said anilide and $R_1$ and $R_2$ are as above assigned.

2. The process for preparing the hydrochloric acid salt of 2(2'-mercapto-4'-thiazolyl)benzimidazole which comprises treating 2-mercaptothiazole-4-carboxy(2'-nitroanilide) with iron and hydrochloric acid, the amount of said iron employed being greater than 2 and less than 9 moles per mole of said nitroanilide and the amount of said hydrochloric acid employed being greater than 3 moles thereof per mole of said iron.

3. The process for preparing the hydrochloric acid salt of 2(2'-mercapto-5'-thiazolyl)benzimidazole which comprises treating 2-mercaptothiazole-5-carboxy(4' - nitroanilide) with iron and hydrochloric acid, the amount of said iron employed being greater than 2 and less than 9 moles per mole of nitroanilide and the amount of said hydrochloric acid employed being greater than 3 moles thereof per mole of said iron.

4. The process for the preparation of a benzimidazole compound having the formula

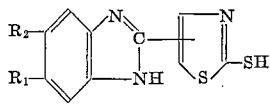

wherein R₁ and R₂ are selected from the group consisting of hydrogen lower alkyl, lower alkoxy and trifluoromethyl groups which comprises treating an anilide of the formula

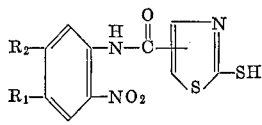

wherein R₁ and R₂ are as above assigned, with hydrogen in the presence of a strong acid wherein the amount of hydrogen employed is greater than 3 and less than 13.5 moles per mole of said anilide to obtain the acid addition salt of said benzimidazole compound, and neutralizing said salt with a base.

5. The process for the preparation of 2(2'-mercapto-4'-thiazolyl)benzimidazole which comprises treating 2-mercaptothiazole-4-carboxy(2'-nitroanilide) with iron and hydrochloric acid, the amount of said iron employed being greater than 2 and less than 9 moles per mole of nitroanilide and the amount of said hydrochloric acid employed being greater than 3 moles thereof per mole of said iron to obtain the hydrochloride of said benzimidazole, and neutralizing said hydrochloride with a base.

6. The process for the preparation of (2'-mercapto-5'-thiazolyl)benzimidazole which comprises treating 2-mercaptothiazole-5-carboxy(2'-nitroanilide) with iron and hydrochloric acid, the amount of said iron employed being greater than 2 and less than 9 moles per mole of nitroanilide and the amount of said hydrochloric acid employed being greater than 3 moles thereof per mole of said iron to obtain the hydrochloride of said benzimidazole, and neutralizing said hydrochloride with a base.

7. The process for the preparation of acid addition salts of a benzimidazole compound selected from the group consisting of

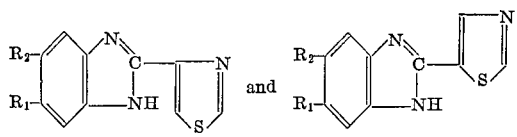

which comprises contacting an anilide of the formula

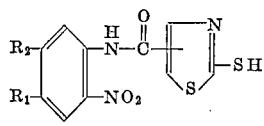

with hydrogen in the presence of a strong acid wherein the amount of hydrogen employed is greater than 13.5 moles per mole of said anilide and R₁ and R₂ are selected from the group consisting of hydrogen lower alkyl, lower alkoxy and trifluoromethyl groups.

8. The process for preparing the hydrochloric acid salt of 2(4'-thiazolyl)benzimidazole which comprises treating 2-mercaptothiazole-4-carboxy(2'-nitroanilide) with iron and hydrochloric acid, the amount of said iron employed being greater than 9 moles per mole of said nitroanilide and the amount of said hydrochloric acid employed being greater than 3 moles thereof per mole of said iron.

9. The process for preparing the hydrochloric acid salt of 2(5'-thiazolyl)benzimidazole which comprises treating 2-mercaptothiazole-5-carboxy(2'-nitroanilide) with iron and hydrochloric acid, the amount of said iron employed being greater than 9 moles per mole of nitroanilide and the amount of said hydrochloric acid employed being greater than 3 moles thereof per mole of said iron.

10. The process for the preparation of a benzimidazole compound selected from the group consisting of

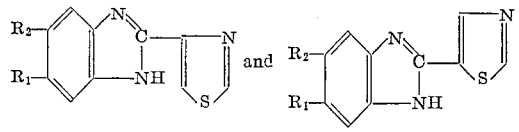

which comprises treating an anilide of the formula

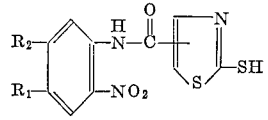

wherein R₁ and R₂ are selected from the group consisting of hydrogen lower alkyl, lower alkoxy and trifluoromethyl groups, with hydrogen in the presence of a strong acid wherein the amount of hydrogen employed is greater than 13.5 moles per mole of said anilide to obtain the acid addition salt of said benzimidazole compound and neutralizing said salt with a base.

11. The process for the preparation of 2(4'-thiazolyl) benzimidazole which comprises treating 2-mercaptothiazole-4-carboxy(2'-nitroanilide) with iron and hydrochloric acid, the amount of said iron employed being greater than 9 moles per mole of nitroanilide and the amount of said hydrochloric acid employed being greater than 3 moles thereof per mole of said iron to obtain the hydrochloride of said benzimidazole, and neutralizing said hydrochloride with a base.

12. The process for the preparation of 2(5'-thiazolyl) benzimidazole which comprises treating 2-mercaptothiazole-5-carboxy(2'-nitroanilide) with iron and hydrochloric acid, the amount of said iron employed being greater than 9 moles per mole of nitroanilide and the amount of said hydrochloric acid employed being greater than 3 moles thereof per mole of said iron to obtain the hydrochloride of said benzimidazole, and neutralizing said hydrochloride with a base.

13. A compound having the formula

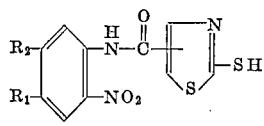

wherein R₁ and R₂ are selected from the group consisting of hydrogen lower alkyl, lower alkoxy and trifluoromethyl.

14. 2-mercaptothiazole-4-carboxy-(2'-nitroanilide).

15. 2-mercaptothiazole-5-carboxy-(2'-nitroanilide).

16. A compound selected from the group consisting of benzimidazole compounds having the formula

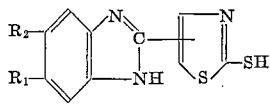

acid addition salts and ammonium, alkali metal, and alkaline earth metal salts thereof wherein R₁ and R₂ are selected from the group consisting of hydrogen lower alkyl, lower alkoxy and trifluoromethyl groups.

17. 2(2'-mercapto-4' - thiazolyl)benzimidazole hydrochloride.
18. 2(2'-mercapto-4'-thiazolyl)benzimidazole.
19. 2(2'-mercapto-5' - thiazolyl)benzimidazole hydrochloride.
20. 2(2'-mercapto-5'-thiazolyl)benzimidazole.

References Cited by the Examiner

UNITED STATES PATENTS

| | | | |
|---|---|---|---|
| 2,186,421 | 1/1940 | Mathes | 260—302 |
| 2,721,868 | 10/1955 | D'Amico | 260—302 |
| 2,746,970 | 5/1956 | D'Amico | 260—302 |
| 2,994,701 | 8/1961 | Sprague et al. | 260—302 |
| 3,017,415 | 1/1962 | Sarett et al. | 260—302 |
| 3,055,907 | 9/1962 | Brown et al. | 260—302 |

OTHER REFERENCES

Hickenbottom, Reactions of Organic Compounds (London, 1948), pp. 294–298.

ALEX MAZEL, *Primary Examiner.*

NICHOLAS S. RIZZO, HENRY R. JILES, *Examiners.*

ALTON D. ROLLINS, *Assistant Examiner.*